United States Patent
Artini et al.

(10) Patent No.: US 7,949,438 B2
(45) Date of Patent: May 24, 2011

(54) METHOD AND DEVICE FOR DETERMINING THE WIDTH OF A SAFETY CORRIDOR FOR AN AIRCRAFT AND METHOD AND SYSTEM FOR SECURING THE AUTOMATIC LOW-ALTITUDE FLIGHT OF AN AIRCRAFT

(75) Inventors: Franck Artini, Toulouse (FR); Benoit Calmels, Toulouse (FR)

(73) Assignee: Airbus, Blagnac (FR)

( * ) Notice: Subject to any disclaimer, the term of this patent is extended or adjusted under 35 U.S.C. 154(b) by 983 days.

(21) Appl. No.: 11/813,967

(22) PCT Filed: Jan. 30, 2006

(86) PCT No.: PCT/FR2006/000201
§ 371 (c)(1),
(2), (4) Date: Jul. 13, 2007

(87) PCT Pub. No.: WO2006/082301
PCT Pub. Date: Aug. 10, 2006

(65) Prior Publication Data
US 2008/0195262 A1    Aug. 14, 2008

(30) Foreign Application Priority Data
Feb. 1, 2005  (FR) ..................................... 05 00983

(51) Int. Cl.
*G01C 23/00* (2006.01)
(52) U.S. Cl. ............................. 701/3; 701/200; 701/202
(58) Field of Classification Search .................. 701/3, 4, 701/10, 11, 200, 202
See application file for complete search history.

(56) References Cited

U.S. PATENT DOCUMENTS

| 3,018,049 | A |   | 1/1962 | Green |
| 4,144,571 | A |   | 3/1979 | Webber |
| 5,663,732 | A | * | 9/1997 | Stangeland et al. ...... 342/357.31 |
| 5,922,031 | A | * | 7/1999 | Larrieu ............................. 701/3 |
| 6,389,354 | B1 | * | 5/2002 | Hicks et al. ................... 701/200 |
| 6,571,155 | B2 | * | 5/2003 | Carriker et al. ................... 701/3 |

(Continued)

FOREIGN PATENT DOCUMENTS

EP          0937963          8/1999

(Continued)

OTHER PUBLICATIONS

T. McGeer. Aerosonde Hazard Estimation. The Insitu Group, Bingen, Washington USA. 7 pp. Jun. 1994.*

(Continued)

*Primary Examiner* — Thomas G Black
*Assistant Examiner* — Ce Li
(74) *Attorney, Agent, or Firm* — Dickinson Wright PLLC

(57) ABSTRACT

A method and device for determining the width of a safety corridor for an aircraft and to a method and system for securing the automatic low-altitude flight of an aircraft. The device includes an input device which can be used by an operator in order to enter a plurality of errors which each have an impact on the automatic low-altitude flight of the aircraft; a probability determination unit for determining an excursion probability of a safety corridor that is not to be crossed; and a width determination unit for determining the width of said safety corridor form the aforementioned errors and excursion probability, taking account of at least one mathematical expression linking at least the errors, the excursion probability and the width.

18 Claims, 2 Drawing Sheets

U.S. PATENT DOCUMENTS

| | | | |
|---|---|---|---|
| 6,792,363 B1 * | 9/2004 | Bye | 702/57 |
| 7,603,209 B2 * | 10/2009 | Dwyer et al. | 701/14 |
| 7,650,232 B1 * | 1/2010 | Paielli | 701/205 |
| 7,761,193 B2 * | 7/2010 | Artini et al. | 701/3 |
| 2001/0013836 A1 * | 8/2001 | Cowie | 340/961 |
| 2003/0036828 A1 * | 2/2003 | Conner et al. | 701/9 |
| 2004/0024528 A1 * | 2/2004 | Patera et al. | 701/301 |
| 2004/0220733 A1 * | 11/2004 | Pasturel et al. | 701/214 |
| 2005/0270224 A1 * | 12/2005 | Silberman et al. | 342/65 |
| 2005/0273223 A1 * | 12/2005 | Artini et al. | 701/9 |

FOREIGN PATENT DOCUMENTS

| | | |
|---|---|---|
| WO | 0002009 | 1/2000 |

OTHER PUBLICATIONS

PCT International Search Report dated May 25, 2005.

* cited by examiner

METHOD AND DEVICE FOR DETERMINING THE WIDTH OF A SAFETY CORRIDOR FOR AN AIRCRAFT AND METHOD AND SYSTEM FOR SECURING THE AUTOMATIC LOW-ALTITUDE FLIGHT OF AN AIRCRAFT

TECHNICAL FIELD OF THE INVENTION

The present invention relates to a method and a device for determining the width of a safety corridor which is defined on either side of the lateral trajectory of a flight trajectory of an aircraft, as well as to a process and a system for securing a low-altitude flight of an aircraft which is guided automatically along such a flight trajectory.

BACKGROUND OF THE INVENTION

Although not exclusively, the present invention applies more particularly to a military transport plane which exhibits a low thrust/weight ratio and high inertia, and whose maneuvering times are generally relatively slow.

Within the context of the present invention, the expression low-altitude flight is understood to mean flight along a flight trajectory (at low altitude) allowing an aircraft to follow as closely as possible the terrain overflown, especially so as to avoid being pinpointed. A low-altitude flight trajectory such as this is therefore usually situated at the lowest at a predetermined height from the terrain, for example 500 feet (around 150 meters).

On account of this proximity to the ground, any lateral or downward vertical swerve (beyond a certain safety margin) of the aircraft, with respect to the flight trajectory to be followed, during the guidance of the aircraft along said flight trajectory, presents a significant risk of collision with the terrain overflown (directly with the ground or with a construction or an element situated on said ground). Of course, the existence of such a risk is not acceptable.

SUMMARY OF THE INVENTION

The object of the present invention is to make secure a low-altitude flight of an aircraft (which is guided automatically along a flight trajectory comprising a lateral trajectory and a vertical trajectory) using a safety corridor in such a way as to render any collision of the aircraft with the terrain overflown highly improbable.

The present invention applies more particularly to an automatic flight which is autonomous, that is to say an automatic flight which is performed only by virtue of navigation, flight management and guidance systems and of a digital terrain base, which are carried onboard, without the aid of any forward-emissive device, such as a radar for example. It is known that an autonomous automatic flight such as this may be subject to a set of errors relating in particular to:

- navigation: the position given by the onboard navigation system is not exactly the real position of the aircraft;
- guidance: an automatic pilot slaves the position given by the navigation system to a trajectory calculated by the flight management system. This slaving exhibits intrinsic performance which conveys the ability of the automatic pilot to guide the aircraft over the requested trajectory. A guidance error may also exist during a flight with the aid of a flight director that the pilot must follow manually;
- flight trajectory: the accuracy of this trajectory depends on the accuracy of the algorithm and the processor of the computer used, and also above all, as appropriate, an error in digital modeling of the terrain overflown.

In order to limit to a probability of occurrence, which is an objective, any risk of (catastrophic) collision with the surrounding terrain, due to a lateral deviation in trajectory resulting in particular from one or more of the errors described hereinabove, a safety corridor exhibiting a sufficient particular width is defined on either side of said flight trajectory.

Thus, the present invention relates to a method for determining the width of such a safety corridor which is defined on either side of the lateral trajectory of a flight trajectory of an aircraft.

To this end, said method is noteworthy in that:
a) a plurality of errors is estimated, each having an impact on a low-altitude automatic (and autonomous) flight of the aircraft;
b) a probability of excursion from the safety corridor not to be exceeded is determined; and
c) on the basis of said errors and of said probability of excursion, the width of said safety corridor is determined taking account of at least one mathematical expression interrelating at least said errors, said probability of excursion and said width.

Thus, by virtue of the invention, it is possible to determine a safety corridor which takes account of the errors that are apt to influence autonomous automatic piloting as specified.

Advantageously, in step a), at least some of the following errors are taken into account:
- a navigation error;
- a guidance error;
- a flight trajectory error.

Furthermore, advantageously, said errors are estimated in the form of probability densities. Preferably, said probability densities satisfy one of the following laws:
- an exponential law;
- a Laplace-Gauss law;
- a Poisson law;
- a polynomial law.

Additionally, advantageously, said probability of excursion equals $10^{-8}$/hdv, hdv representing an hour of flight of the aircraft.

Advantageously, in the case of two different errors, which are independent in the probabilistic sense, said mathematical expression corresponds to:

$$P = 1 - 2^- \int_0^d \left( \int_{-\infty}^{+\infty} f1(x) \cdot f2(y-x) \cdot dx \right) \cdot dy \quad (1)$$

in which:
P represents said probability of excursion;
d represents half said width of the safety corridor;
f1 represents the probability density relating to a first of said errors; and
f2 represents the probability density relating to the second error.

Furthermore, advantageously, in the case of three different errors of respective individual probability densities fi, use is also made of said mathematical expression (1) making it possible to calculate P as a function of two (global) probability densities f1 and f2, f1 corresponding to the probability density resulting from the sum of two errors of individual probability density fi and f2 to the individual probability density fi of the third remaining error.

Furthermore, when said errors are expressed in the form of a Laplace-Gauss law, advantageously, the width of the safety corridor corresponds to twice the quadratic mean of the limits of said errors extrapolated to the objective of said probability of excursion. In this case, preferably, said mathematical expression corresponds to:

$$d = L(p) \cdot \sqrt{\sum_{i=1}^{n} \sigma i^2}$$

in which:
- d represents half said width of the safety corridor;
- L(p) is an expansion coefficient which depends on a probability p of occurrence of an error; and
- σi is the standard deviation of the Gaussian distribution of an error i.

It will be noted that if one knows an error limit to a probability p, the Laplace-Gauss law makes it possible to deduce the standard deviation σ from the error distribution. In the present case, the Laplace-Gauss law is entirely determined by the pair (μ, σ), μ being the mean of the error, which is zero, since the errors have the same probability of arising on the right or on the left. The limit of this error (corresponding to a certain probability of departing therefrom) is obtained through the expression L(p). σ. The Laplace-Gauss law makes it possible to determine the coefficient L(p) for p lying in the interval [0, 1]. In general, the limits of error of navigation, of guidance or of trajectory are known to 95%, thereby making it possible to determine the standard deviation σ, and thus the error limits to any other probability.

Additionally, advantageously, a margin taking account of the wingspan of the aircraft is added to said width.

In a particular embodiment, at least one error which is due to a fault with at least one system (flight controls, engine, etc.) of the aircraft is taken into account, such a fault possibly inducing an additional lateral swerve. This fault arises with a certain probability.

The present invention also relates to a process for securing a low-altitude flight of an aircraft which is guided along a flight trajectory comprising a lateral trajectory and a vertical trajectory.

According to the invention, said process is noteworthy in that:
- the width of a safety corridor is determined by implementing the method specified hereinabove;
- a safety corridor, free of any obstacle, is determined which exhibits said width and which is delimited on either side of said lateral trajectory; and
- the aircraft is guided automatically along said flight trajectory.

Thus, as the safety corridor is free of any obstacle to within the objective probability, in particular of any terrain part such as a summit for example, the risk of collision for the aircraft during the low-altitude flight along said flight trajectory is minimized, while the aircraft remains in this safety corridor, this obviously being the case (with a certain probability that can be minimized) by reason of the aforesaid mode of determination of said safety corridor which exhibits a sufficient width, in particular when errors of the aforesaid type arise.

The present invention also relates to a device for determining the width of a safety corridor which is defined on either side of the lateral trajectory of a flight trajectory of an aircraft.

According to the invention, this device comprises:
- means making it possible to input (into said device) a plurality of errors which each have an impact on a low-altitude automatic (and autonomous) flight of the aircraft;
- means for determining a probability of excursion from the safety corridor not to be exceeded; and
- means for determining the width of said safety corridor, on the basis of said errors and of said probability of excursion, taking account of at least one mathematical expression interrelating at least said errors, said probability of excursion and said width.

Additionally, the present invention relates to a system for securing a low-altitude flight of an aircraft, of the type comprising:
- first means for determining a flight trajectory comprising a lateral trajectory and a vertical trajectory; and
- means of guidance for automatically guiding the aircraft along said flight trajectory, also comprising navigation means.

According to the invention, this securing system moreover comprises:
- a device such as that specified previously, for determining the width of a safety corridor; and
- second means for determining a safety corridor, free of any obstacle, which exhibits said width determined by said device and which is delimited on either side of said lateral trajectory.

By virtue of said safety corridor, whose width takes account of the errors apt to appear during the flight, the securing system is able to minimize the risk of collision of the aircraft with the terrain. The low-altitude automatic flight of the aircraft is therefore made secure in part, at least in respect of lateral swerves.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
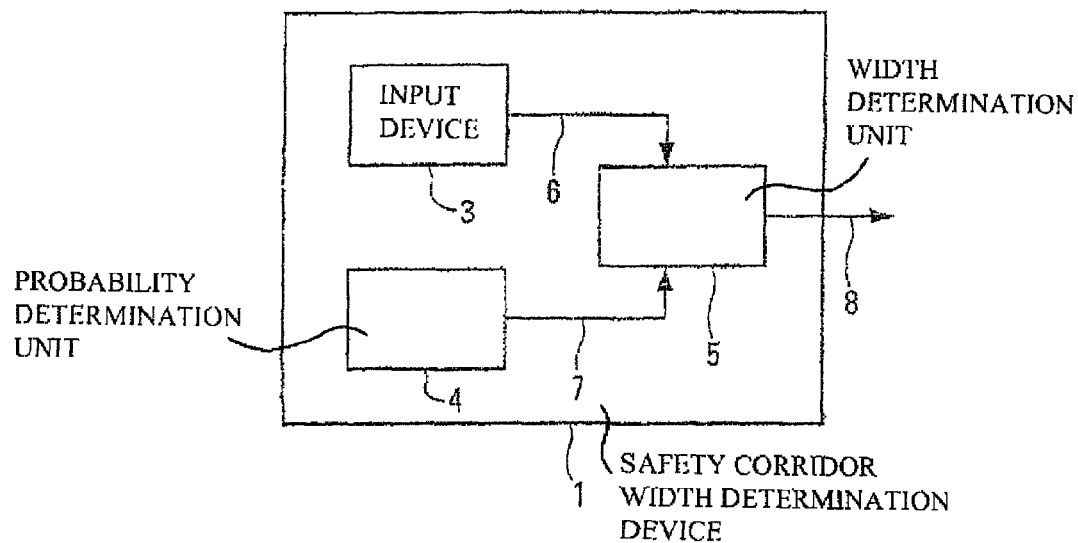
FIG. 1 is the schematic diagram of a device in accordance with the invention.

The device 1 in accordance with the invention and represented diagrammatically in FIG. 1 is intended to determine the width D of a safety corridor CS which is defined on either side of the lateral trajectory TL of a flight trajectory TO of an aircraft A flying at low altitude, in particular a military transport plane.

According to the invention, said device 1 comprises,
- means 3 making it possible to input into the device 1 a plurality of estimated errors, specified hereinbelow, which each have an impact on a low-altitude automatic (and autonomous, that is to say without use of any emissive device such as a radar) flight of the aircraft A;
- means 4 for determining a probability of excursion from the safety corridor CS, not to be exceeded; and
- means 5 connected respectively by way of links 6 and 7 to said means 3 and 4, for determining the width D of said safety corridor CS, on the basis of said errors and of said probability of excursion, taking account of at least one mathematical expression interrelating at least said errors, said probability of excursion and said width D.

In a preferred embodiment, the device 1 can take account of at least some of the following errors (input with the aid of the means 3):

a navigation error which takes account of the fact that the position given by an onboard navigation system does not correspond exactly to the real position of the aircraft A;

a guidance error which takes account of the fact that an automatic pilot (or a flight director and the pilot, in the case of a flight director-based flight) slaves the position given by the navigation system to a trajectory calculated by a flight management system. This slaving exhibits intrinsic performance which conveys the ability of the automatic pilot to guide the aircraft A over the requested trajectory (or the ability of the flight director and that of the pilot to follow it); and a flight trajectory error which takes account of the fact that the accuracy of the flight trajectory TO depends on the accuracy of the algorithm and the processor of a standard computer which determines this flight trajectory TO, and also the error (predominant) of the digital modeling of the terrain 2 overflown, which modeling is used for this purpose by the computer.

Moreover, preferably:

the navigation error to the objective probability is calculated in real time onboard by the navigation system;

the terrain database error is in general contained in the database or declared by default in the aircraft; and the guidance error is defined by default once and for all in the aircraft.

The aforesaid errors used are previously estimated in the form of probability densities by the providers of the systems concerned (navigation, guidance, etc.) of the aircraft A, and are thereafter input with the aid of the means 3 so as to be transmitted to said means 5. Preferably, but not exclusively, said probability densities satisfy one of the following laws:

an exponential law;
a Laplace-Gauss law;
a Poisson law; and
a polynomial law.

In a particular embodiment, said means 4 use as probability of excursion $10^{-8}$/hdv, hdv representing an hour of flight of the aircraft A, that is to say that the aircraft A then exhibits a probability of $10^{-8}$ of risk of departure (or of excursion) from the safety corridor CS per hour of flight, due to a lateral deviation between the real position of the aircraft A and the desired trajectory.

In a preferred embodiment, in the case of the taking into account of two different errors, said means 5 use as mathematical expression:

$$P = 1 - 2 \int_0^d \left( \int_{-\infty}^{+\infty} f1(x) \cdot f2(y-x) \cdot dx \right) \cdot dy \quad (1)$$

in which:

P represents said probability of excursion;
d represents half said width D of the safety corridor CS;
f1 represents the probability density relating to a first of said two errors; and
f2 represents the probability density relating to the second error.

In a general manner, in the case of three different errors of respective individual probability densities fi, said means 5 also use said aforesaid mathematical expression (1) making it possible to calculate P as a function of two probability densities f1 and f2 (which in this case are global), f1 corresponding to the probability density resulting from the sum of two errors of individual probability density fi and f2 corresponding to the individual probability density fi of the third remaining error.

More precisely, for the aforesaid expression (1):

$$P = 1 - 2 \int_0^d \left( \int_{-\infty}^{+\infty} f1(x) \cdot f2(y-x) \cdot dx \right) \cdot dy$$

y can represent the sum of two errors x1+x2.

As P may be written $$P = 1 - 2 \int_0^d f(y) \cdot dy$$

where f represents the probability density of the random variable y=x1+x2, we then have for the sum of three errors x1+x2+x3=y+x3

$$P = 1 - 2 \int_0^d \left( \int_{-\infty}^{+\infty} f(y) \cdot fz(z-x3) \cdot dx3 \right) \cdot dy$$

with $$f(y) = \int_{-\infty}^{+\infty} f1(x) \cdot f2(y-x) dx$$

The device 1 in accordance with the invention therefore calculates a width D of safety corridor CS which makes it possible to maintain an objective of probability of departure from this safety corridor CS not to be exceeded, by taking account of the various errors which have an impact on the safety of a low-altitude automatic flight.

In a particular embodiment, for which said errors are defined according to a Gaussian distribution, that is to say are expressed in the form of a standard Laplace-Gauss law, the width D of the safety corridor CS corresponds to twice the quadratic mean of the limits of said errors extrapolated to the objective of said probability of excursion.

In this case, said means 5 use said following mathematical expression:

$$d = L(p) \cdot \sqrt{\sum_{i=1}^n \sigma i^2} \quad (2)$$

in which:

d represents half said width D of the safety corridor CS;
L(p) is a coefficient of predetermined width for a probability objective of p/hdv, defined entirely by the Gauss law and in a unique manner [valid regardless of the Gaussian distribution defined by (σ, μ)];
the i represent the errors taking into account, which are assumed to be Gaussian and pairwise independent; and
σi is the standard deviation of the Gaussian distribution of an error i.

The following table gives the evolution of the limit L (or width coefficient) of an error as a function of a probability objective. It is formed for a distribution of the error with σ=1 meter and μ=0 meters (symmetric distribution about TL).

| L | σ | Probability that x is between L and −L (σ given = 1 meter) |
|---|---|---|
| 0.674 | 1.0 | 0.5 |
| 1.000 | 1.0 | 0.68 |
| 1.645 | 1.0 | 0.9 |
| 1.960 | 1.0 | 0.95 |
| 2.000 | 1.0 | 0.9545 |
| 2.576 | 1.0 | 0.99 |
| 3.291 | 1.0 | 0.999 |
| 3.891 | 1.0 | 0.9999 |
| 4.417 | 1.0 | 0.99999 |
| 4.892 | 1.0 | 0.999999 |
| 5.327 | 1.0 | 0.9999999 |
| 5.731 | 1.0 | 0.99999999 |
| 6.110 | 1.0 | 0.999999999 |

The standard deviation σ is chosen equal to 1 meter for reasons of clarity. It can be deduced therefrom that, for a Gaussian distribution for which μ=0 meters and σ=1 meter:

the probability that the error is greater than a limit of ±0.67 meters is 0.5 (that is to say 50% chance of being outside this limit);

the probability that the error is greater than a limit of ±1.96 meters is 0.05 (5%);

the probability that the error is greater than a limit of ±2 meters is 0.0455 (4.55%);

...

the probability that the error is greater than a limit of ±4.89 meters is $10^{-5}$;

the probability that the error is greater than a limit of ±5.32 meters is $10^{-6}$;

the probability that the error is greater than a limit of ±5.73 meters is $10^{-7}$;

the probability that the error is greater than a limit of ±6.11 meters is $10^{-9}$.

It will be noted by way of example that the width of corridor corresponding to a probability of $10^{-9}$/hdv must be 3.12 times larger (6.110/1.960=3.12) than the width of corridor corresponding to a probability of $5.10^{-2}$/hdv.

Another interesting feature of this distribution is that the probability of excursion from a safety corridor CS of dimensions [−L; +L] with a Gaussian distribution law having a standard deviation σ equal to 1 meter, given by the table above, is equal to the probability of an excursion from a corridor which is p times wider [−p.L; +p.L] with a Gaussian distribution law having a standard deviation σ equal to p meters.

If it is assumed that the navigation or guidance error is of Gaussian type and that it is characterized by a certain limit with a certain probability, then:

firstly, the entire distribution in this error is determined, by calculating a standard deviation σ equal to p meters (the mean μ of the error being zero, since there is as much chance of the navigation or guidance error being on one side or the other of the trajectory); and thereafter, the probability of excursion from a corridor [−p.L; +p.L] can be deduced directly therefrom by replacing L by p.L in the table above (so as to obtain the following table).

| L | σ | Probability that x is between L and −L (σ given = p meters) |
|---|---|---|
| 0.674 p | p | 0.5 |
| 1 p | p | 0.68 |
| 1.645 p | p | 0.90 |
| 1.960 p | p | 0.95 |
| 2 p | p | 0.95445 |
| 2.576 p | p | 0.99 |
| 3.291 p | p | 0.999 |
| 3.891 p | p | 0.9999 |
| 4.417 p | p | 0.99999 |
| 4.892 p | p | 0.999996 |
| 5.327 p | p | 0.9999999 |
| 5.731 p | p | 0.99999999 |

Consequently, if one knows an error limit to a certain probability, one deduces the limit of this error to another probability by multiplying the first by the ratio of the corresponding width coefficients "L".

Thus, by virtue of the invention, it suffices:

to estimate the elementary errors (navigation, guidance, database, terrain, etc.), this making it possible in the case of Gaussian errors to determine the standard deviation σ of each error [and otherwise, to determine the probability densities fi of the aforesaid mathematical expression (1)];

to specify the safety level required in the form of a probability of excursion from the safety corridor CS not to be exceeded (defined for example contractually between the manufacturer of the aircraft A and the customer); and to deduce therefrom the width D of the safety corridor CS in the aforesaid manner.

Regardless of the embodiment used, a margin taking account of the wingspan of the aircraft A is preferably added to said width D.

Hitherto, consideration has been given to a swerve of the aircraft A that is due solely to the intrinsic performance of the navigation and guidance systems, as well as to the accuracy of the terrain database, without considering any fault with a system (flight controls, engine, etc.) of the aircraft A that may induce an additional swerve.

In a particular embodiment, to take account of an additional swerve such as this due to a system fault, the device 1 in accordance with the invention takes into account at least one error which is due to a fault with at least one system of the aircraft.

It is assumed that the fault j may arise with a probability per hour of flight equal to $P_j$, and that this fault induces an additional lateral swerve ±$d_j$ (discrete swerve) to the right or to the left with the same probability (i.e. $P_j/2$ for each side). This lateral swerve is assumed to be always the same when the fault arises.

Thus, the probability P that the total swerve of the aircraft A (swerve due to the intrinsic performance of its systems, as represented by a value TSE, plus that due to a system fault) is less than d in absolute value is equal to the sum of the following probabilities:

the probability that the system fault j occurs and induces a swerve $d_j$ to the right and that $(TSE+d_j) \in [-d, d]$, i.e. $TSE \in [-d-d_j; d-d_j]$;

the probability that the system fault j occurs and induces a swerve $d_j$ to the left and that $(TSE-d_j) \in [-d; d]$, i.e. $TSE \in [-d+d_j; d+d_j]$; and the probability that the system fault is absent, but that TSE is less than d in absolute value.

It will be noted that the variable TSE ("Total System Error") corresponds to the sum of the navigation, guidance and trajectory errors.

Thus, we have:

$$P = 1 - \left\{ P_j \left[ \int_0^{d-dj} f(y) \cdot dy + \int_0^{d+dj} f(y) \cdot dy \right] + (1 - P_j) \int_{-d}^{+d} f(y) \cdot dy \right\}$$

where f is the probability density of the random variable TSE $$P = 1 - \left\{ P_j \sum \int_0^{d \pm dj} f(y) \cdot dy + (1 - P_j) \int_{-d}^{+d} f(y) \cdot dy \right\}$$

The reasoning can be extended to the case of two simultaneous faults i and j of probability $P_i$ and $P_j$ which induce swerves of $\pm d_i$ and $\pm d_j$ respectively.

The probability P that the total swerve of the aircraft A is less than d in absolute value is equal to the sum of the following probabilities:

the probability that the system faults i and j arise at the same time and that $(TSE \pm d_i \pm d_j) \in [-d; d]$ ($\pm$ as a function of the direction of the swerve induced by each system fault, to iso-probability for each case);

the probability that the system fault i is present while the system fault j is absent, but that $(TSE \pm d_i) \in [-d; d]$ ($\pm$ as a function of the direction of the swerve induced by the system fault i);

the probability that the system fault j is present while the system fault i is absent, but that $(TSE \pm d_j) \in [-d; d]$ ($\pm$ as a function of the direction of the swerve induced by the system fault j); and the probability that the system faults i and j are absent, but that TSE is less than the d in absolute value.

We therefore have:

$$P = 1 - \left\{ 2 \cdot \frac{P_i}{2} \cdot \frac{P_j}{2} \sum \int_0^{d \pm dj} f(y) \cdot dy + (1 - P_i) P_j \sum \int_0^{d \pm dj} f(y) \cdot dy + (1 - P_j) P_i \sum \int_0^{d \pm di} f(y) \cdot dy + 2(1 - P_i)(1 - P_j) \int_0^d f(y) \cdot dy \right\}$$

Figure 3:
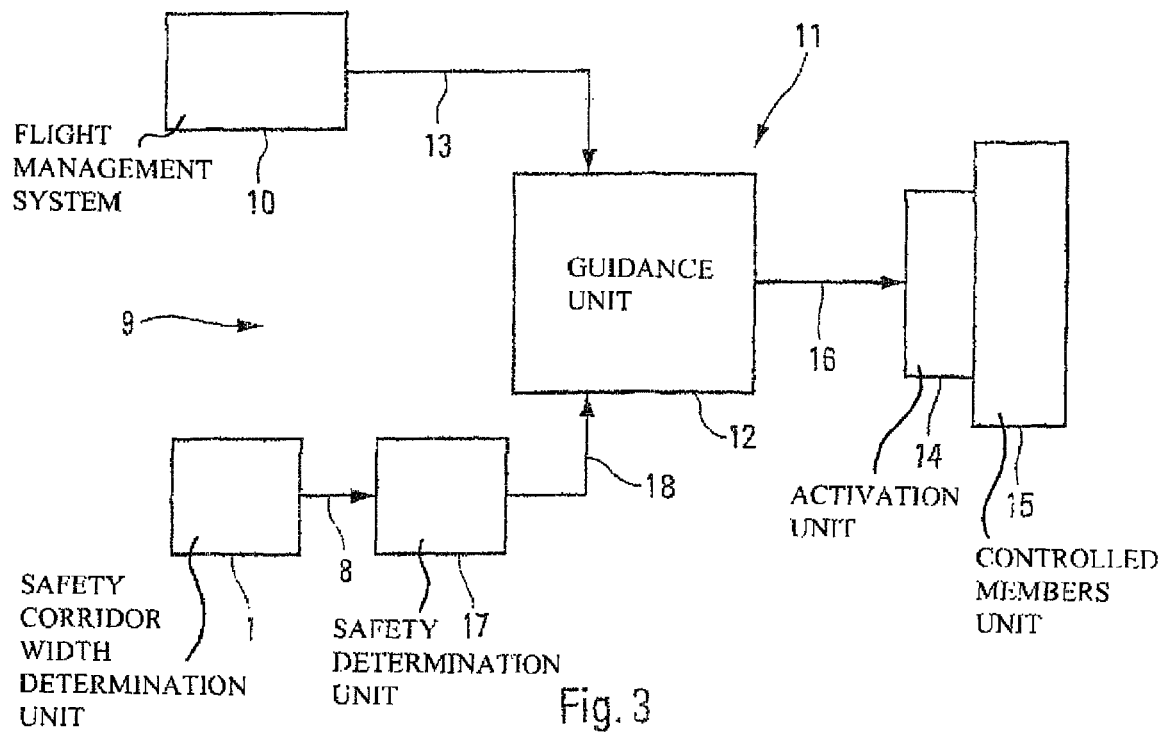
FIG. 3 is the schematic diagram of a securing system in accordance with the invention.

The safety corridor CS width D (D=2d) thus determined by the device 1 can be used by a system 9 for securing an (automatic and autonomous) low-altitude flight of an aircraft A, in accordance with the invention and represented diagrammatically in FIG. 3.

Said system 9 which is therefore intended to implement an automatic and autonomous low-altitude flight of the aircraft A, is of the type comprising:

standard means 10, for example a flight management system, for determining in a standard manner a flight trajectory TO comprising a lateral trajectory TL defined in a horizontal plane and a vertical trajectory (or flight profile) defined in a vertical plane. To be able to achieve a low-altitude flight, the flight trajectory TO (at low altitude) must allow the aircraft A to follow as closely as possible the terrain overflown 2; and standard guidance and navigation means 11 for automatically guiding the aircraft A along said flight trajectory TO. In a preferred embodiment, said guidance means 11 comprise:

means 12, for example an automatic pilot, which are connected by a link 13 to said means 10 for determining piloting orders for the aircraft A so that it follows said flight trajectory TO; and means of actuation 14 of controlled members 15 such as for example rudders, elevators, etc. of the aircraft A, means of actuation 14 which are connected by a link 16 to said means 12 and to which the piloting orders determined by the latter are applied automatically.

Said guidance means 11 may also comprise a flight director.

Figure 2:
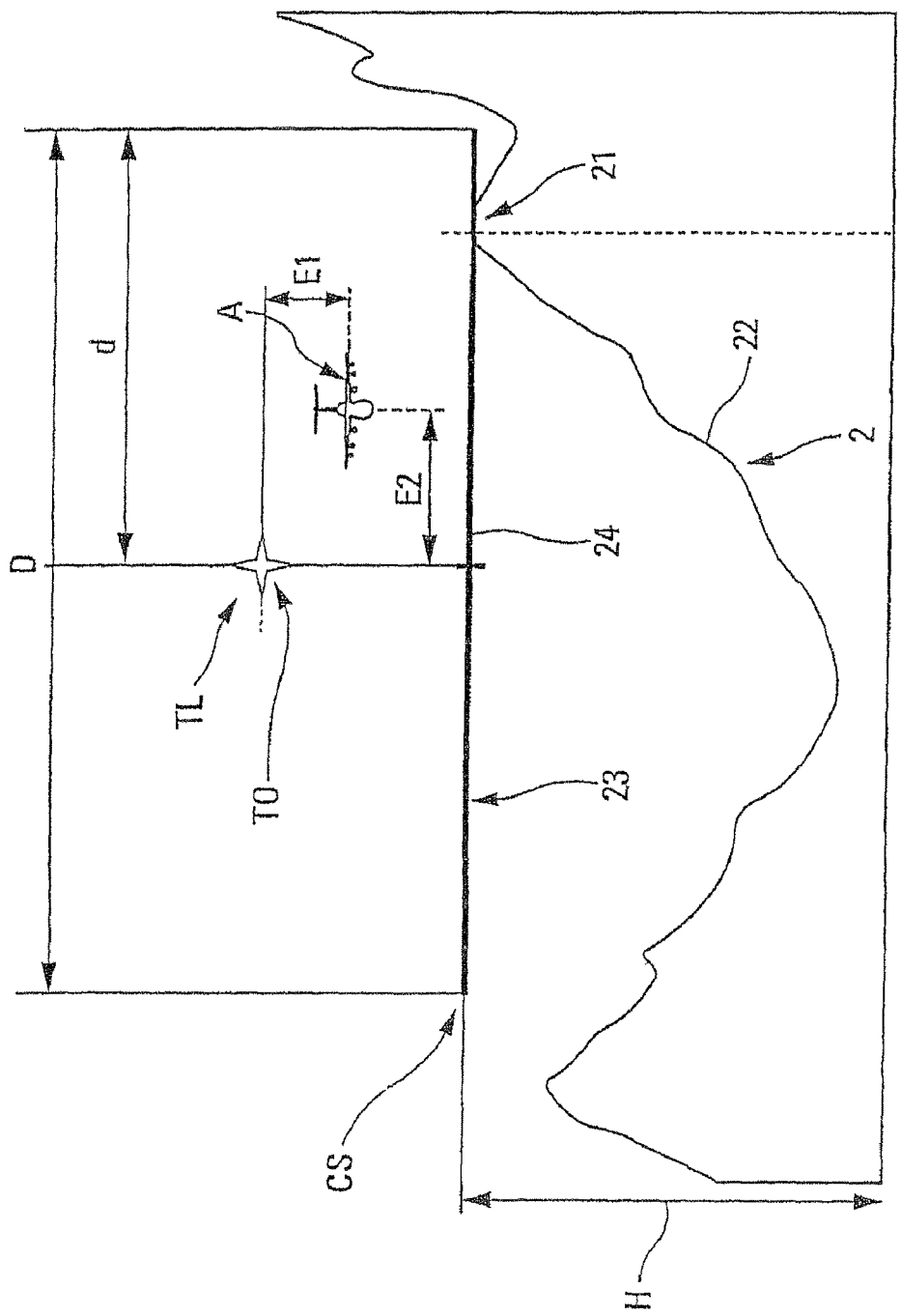
FIG. 2 diagrammatically illustrates in a vertical plane characteristics of a safety corridor.

To secure the low-altitude flight, said system 9 moreover comprises:

a device 1 such as that specified hereinabove, for determining the width D of a safety corridor CS; and means 17 which are connected by a link 8 to said device 1 and by a link 18 to said means 12, for determining a safety corridor CS:

which is free of any obstacle;

which exhibits said width D determined by said device 1; and which is defined on either side of said lateral trajectory TL and which is centered on the latter, as represented in FIG. 2.

Thus, as the safety corridor CS is free by definition of any obstacle, in particular of any terrain part 2 such as a summit 21 for example, the risk of collision for the aircraft A during the low-altitude automatic flight along said flight trajectory TO is minimized, while said aircraft A is held within this safety corridor CS. Now, said aircraft A is held constantly in said safety corridor CS by virtue of the action of said automatic guidance means 11 and of the fact that said safety corridor CS takes account by definition of the errors apt to arise during an automatic flight such as this (which is implemented by said automatic guidance means 11).

In the lateral plane, the safety corridor CS is therefore centered on the lateral trajectory TL and is limited on either side by the distance d representing half said width D.

Although not directly forming part of the subject matter of the present invention, it will also be noted that, in the vertical plane, said safety corridor CS is not delimited above, but is delimited below, by the highest part 21 of the terrain 2 (whose relief 22 has been represented in FIG. 2) which exists under a horizontal surface 23. This part 21 exhibits an altitude H. In a preferred embodiment, said surface 23 is determined, by taking account in particular of the aforesaid errors.

Preferably, this surface 23 exhibits the width D of the safety corridor CS. Thus, in the representation of FIG. 2 which corresponds to this latter situation, the safety corridor CS and the surface 23 are represented by one and the same straight line segment 24.

The automatic low-altitude flight, implemented by said securing system 9, therefore makes it possible to fly the aircraft A, at a given height above the terrain 2, in automatic mode, along a flight trajectory TO calculated from a digital terrain base (previously loaded into the aircraft A), and to do so without risk of collision with the terrain 2.

The invention claimed is:

1. A method for determining a width of a safety corridor which is defined on either side of a lateral trajectory of a flight trajectory of an aircraft, comprising:

a) estimating a plurality of errors, each having an impact on a low-altitude automatic flight of the aircraft;

b) determining a probability of excursion from the safety corridor not to be exceeded; and c) determining, based on said errors and of said probability of excursion, the width of said safety corridor taking account of at least one mathematical expression interrelating at least said errors, said probability of excursion and said width.

2. The method as claimed in claim 1, wherein in step a), at least one of the following errors are taken into account:
   a navigation error;
   a guidance error; and
   a flight trajectory error.

3. The method as claimed in claim 1, wherein said errors are estimated in the form of probability densities.

4. The method as claimed in claim 3, wherein said probability densities satisfy at least one of the following laws:
   an exponential law;
   a Laplace-Gauss law;
   a Poisson law; and
   a polynomial law.

5. The method as claimed in claim 1, wherein said probability of excursion equals $10^{-8}$/hdv, hdv representing an hour of flight of the aircraft.

6. The method as claimed in claim 1, wherein, in a case of two different errors, said mathematical expression corresponds to:

$$P = 1 - 2 \int_0^d \left( \int_{-\infty}^{+\infty} f1(x) \cdot f2(y-x) \cdot dx \right) \cdot dy$$

in-which:
P represents said probability of excursion;
d represents half said width of the safety corridor;
f1 represents the probability density relating to a first of said errors; and
f2 represents the probability density relating to the second error.

7. The method as claimed in claim 6, wherein, in a case of three different errors of respective individual probability densities fi, said mathematical expression is used to calculate P as a function of two probability densities f1 and f2, f1 corresponding to the probability density resulting from the sum of two errors of individual probability density fi and f2 to the individual probability density fi of the third remaining error.

8. The method as claimed in claim 1, wherein said errors are expressed in the form of a Laplace-Gauss law, and the width of the safety corridor corresponds to twice the quadratic mean of the limits of said errors extrapolated to the objective of said probability of excursion.

9. The method as claimed in claim 8, wherein said mathematical expression corresponds to:

$$d = L(p) \cdot \sqrt{\sum_{i=1}^{n} \sigma i^2}$$

in which:
d represents half said width of the safety corridor;
L(p) is an expansion coefficient which depends on a probability p of occurrence of an error; and
σi is the standard deviation of the Gaussian distribution of an error i.

10. The method as claimed in claim 1, wherein a margin taking account of the wingspan of the aircraft is added to said width.

11. The method as claimed in claim 1, wherein at least one error which is due to a fault with at least one system of the aircraft is taken into account.

12. A process for securing a low-altitude flight of an aircraft which is guided along a flight trajectory having a lateral trajectory and a vertical trajectory, comprising:
   determining the width of a safety corridor according to the method specified under claim 1;
   determining a safety corridor, free of any obstacle, which exhibits said width and which is delimited on either side of said lateral trajectory; and
   automatically guiding the aircraft along said flight trajectory.

13. An aircraft comprising a system able to implement the process specified under claim 12.

14. An aircraft comprising a device to implement the method specified under claim 1.

15. A device for determining a width of a safety corridor which is defined on either side of a lateral trajectory of a flight trajectory of an aircraft, wherein said device comprises:
   an input device to input a plurality of errors which each have an impact on a low-altitude automatic flight of the aircraft;
   a probability determination unit for determining a probability of excursion from the safety corridor not to be exceeded; and
   a width determination unit for determining the width of said safety corridor, based on the said errors and of said probability of excursion, taking account of at least one mathematical expression interrelating at least said errors, said probability of excursion and said width.

16. A system for securing a low-altitude flight of an aircraft, said system comprising:
   a flight management system for determining a flight trajectory having a lateral trajectory and a vertical trajectory; and
   a guidance unit for automatically guiding the aircraft along said flight trajectory, including a navigation unit,
   wherein said system further comprises:
   a device such as that specified under claim 15, for determining the width of a safety corridor; and
   a safety determination unit for determining a safety corridor, free of any obstacle, which exhibits said width determined by said device and which is delimited on either side of said lateral trajectory.

17. An aircraft comprising a device such as that specified under claim 15.

18. An aircraft comprising a system such as that specified under claim 16.

* * * * *